(12) United States Patent
Ricard et al.

(10) Patent No.: US 7,144,568 B2
(45) Date of Patent: Dec. 5, 2006

(54) METHOD AND DEVICE FOR CARRYING OUT A REACTION IN LIQUID MEDIUM WITH GAS EVOLUTION

(75) Inventors: Jean Philippe Ricard, Levallois-Perret (FR); Joel Choupeaux, Jouy le Moutier (FR); Jean Michel Delassus, Creteil (FR)

(73) Assignee: Arkema France, Paris (FR)

( * ) Notice: Subject to any disclaimer, the term of this patent is extended or adjusted under 35 U.S.C. 154(b) by 365 days.

(21) Appl. No.: 10/451,848

(22) PCT Filed: Dec. 21, 2001

(86) PCT No.: PCT/FR01/04158

§ 371 (c)(1),
(2), (4) Date: Dec. 16, 2003

(87) PCT Pub. No.: WO02/053277

PCT Pub. Date: Jul. 7, 2002

(65) Prior Publication Data

US 2004/0081610 A1   Apr. 29, 2004

(30) Foreign Application Priority Data

Dec. 28, 2000   (FR)   ................... 00 17199

(51) Int. Cl.
*B01J 7/00*   (2006.01)
*B01J 14/00*   (2006.01)
*C01B 7/03*   (2006.01)
*C01B 9/00*   (2006.01)

(52) U.S. Cl. .............. 423/659; 423/462; 423/491; 423/499.1; 423/499.4; 423/481; 423/486; 422/129; 422/187; 422/188; 422/189; 422/224; 422/234

(58) Field of Classification Search ............... 423/462, 423/491, 499.1, 499.4, 481, 486, 659; 422/129, 422/187, 188, 189, 224, 234
See application file for complete search history.

(56) References Cited

U.S. PATENT DOCUMENTS

| 4,721,565 A * | 1/1988 | Carroll .................. 210/251 |
| 5,152,904 A * | 10/1992 | Kedem et al. ............. 210/711 |
| 5,354,435 A | 10/1994 | Cawlfield et al. |
| 5,475,084 A * | 12/1995 | Okamoto et al. ....... 528/502 E |
| 5,633,329 A | 5/1997 | Krauss et al. |
| 6,655,829 B1 * | 12/2003 | Vanden Bussche et al. ................ 366/165.1 |
| 2003/0005823 A1 * | 1/2003 | Le Blanc et al. ............. 95/149 |
| 2004/0100861 A1 * | 5/2004 | Vanden Bussche et al. ................ 366/165.1 |

FOREIGN PATENT DOCUMENTS

| DE | 3723799 | 1/1989 |
| EP | 0150835 | 8/1985 |

* cited by examiner

*Primary Examiner*—Timothy C. Vanoy

(57) ABSTRACT

Described is a process and a device for carrying out a reaction in liquid medium during which evolution of gas occurs. The process can be applied in particular to a reaction employing a peroxide such as hydrogen peroxide and, in particular, to the reduction of chlorine present in an aqueous effluent.

27 Claims, 1 Drawing Sheet

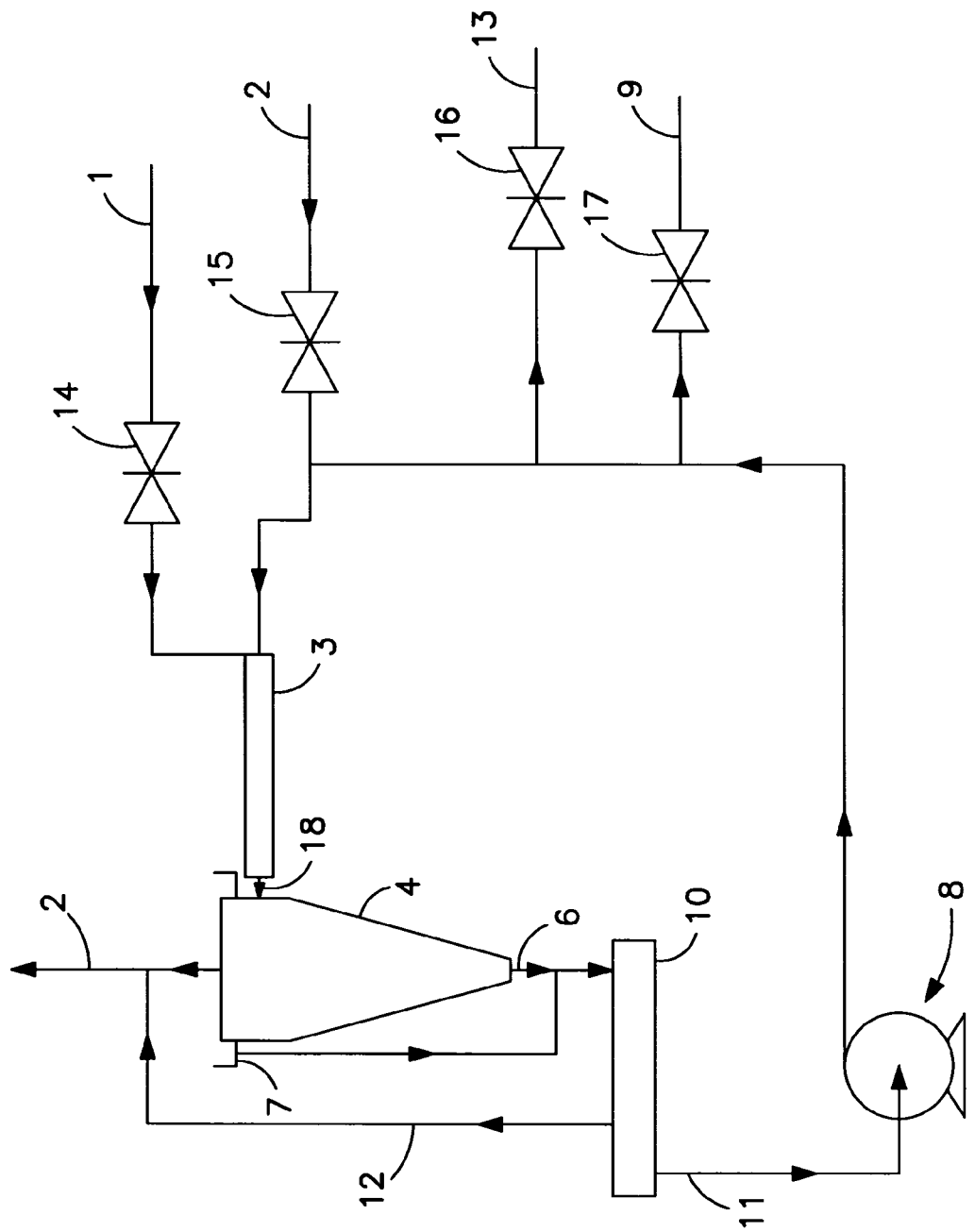

METHOD AND DEVICE FOR CARRYING OUT A REACTION IN LIQUID MEDIUM WITH GAS EVOLUTION

The invention relates to a process and a device for carrying out a reaction in liquid medium during which evolution of gas occurs.

The invention can be applied in particular to a reaction employing a peroxide such as hydrogen peroxide and, in particular, to the reduction of chlorine present in an aqueous effluent.

It is known to reduce chlorine having a degree of oxidation of greater than or equal to zero using hydrogen peroxide.

As examples mention may be made of the following known reactions:

$$NaClO + H_2O_2 \rightarrow NaCl + O_2 + H_2O$$

$$ClOH + H_2O_2 \rightarrow HCl + O_2 + H_2O$$

$$Cl_2 + H_2O_2 \rightarrow O_2 + 2HCl$$

Also known, from European patent application no. 863 218, is a method of recovering germanium from gaseous effluents originating from chemical deposits in vapor phase which comprises a step in which, in a mixer, using a peroxide such as hydrogen peroxide, hypochlorite ions (ClO⁻) are reduced to chloride ions (Cl⁻).

Another process, described in U.S. Pat. No. 5,354,435, proposes producing chlorine dioxide from a solution of chloric acid ($HClO_3$). This process includes a step during which, in a conical reactor, a solution of chloric acid is reacted with a reducing agent such as hydrogen peroxide.

As shown by the above reaction there is an evolution of oxygen, which generally gives rise to substantial foaming. Since this foaming is disruptive, it is generally avoided by introducing a chemical antifoam into the reaction medium.

Another solution consists in breaking the foam formed by means of specific equipment provided in the reactors, for example, by surface spraying, or by means of a stirrer rotating at the surface in the frothing mass.

The aim of the invention is therefore to provide simple, economic and easy-to-use equipment making it possible on the one hand to implement the reaction under conditions which ensure a high degree of safety and on the other hand to obtain high kinetics, a high yield, and high productivity.

The invention accordingly provides a device for carrying out a reaction in a liquid medium during which evolution of gas occurs, said device being characterized in that it comprises at least:

one static mixer in which emerges at least one pipe for feeding with liquid medium;
one cyclonic reactor connected to said static mixer and equipped with a chimney for the discharge of the gas or gases formed and with means for discharge of the liquid medium.

The invention likewise provides a process in which a reaction is carried out in a liquid medium during which evolution of gas occurs, this process being characterized in that it comprises the following stages:

the liquid medium is introduced into a static mixer and the reaction is allowed to begin;
the reaction medium is transferred from the static mixer to a cyclonic reactor;
the reaction is allowed to continue in the cyclonic reactor; and
the liquid medium exiting at the bottom from the cyclonic reactor is recovered, optionally after its entry into a gas/liquid separator.

Other features and advantages of the invention will emerge on reading the specification which follows and which is given by reference to the single FIGURE attached, which represents diagrammatically the device according to the invention in its preferred embodiment.

DETAILED EXPOSITION OF THE INVENTION

Device According to the Invention

The single FIGURE attached represents the device according to the invention, in its preferred form.

This device is based on the combination of at least two apparatus:

a static mixer 3 in which emerges at least one pipe 1 for feeding with liquid medium;
a cyclonic reactor 4 connected to said static mixer 3 and equipped with a chimney 5 for the discharge of the gas or gases formed and with means for discharge 6, 7 of the liquid medium.

The static mixer 3 is of conventional type; it may, for example, consist of helicoidal elements.

The cyclonic reactor 4 is likewise of conventional type. Overall it has a conical or frustoconical form whose apex constitutes the bottom part. The bottom part may further be equipped with an antivortex device (not shown).

The cyclonic reactor 4 is fed with liquid medium at its top part via a pipe 18 which connects it to the outlet of the static mixer 3.

Preferably this pipe 18 connecting the outlet of the mixer 3 to the cyclonic reactor 4 is arranged such that the reaction medium enters tangentially into the cyclonic reactor 4. This makes it possible, in effect, for better evolution of the gases present in the liquid medium.

The means for discharge 6, 7 of the cyclonic reactor 4 serve to evacuate the liquid medium from this reactor. They may therefore consist of a gutter 7 located at the level of the top part of the reactor. Discharge of the reactor is in this case effected by overflow. Thus, during operation of the reactor, the liquid medium overflowing at the top of the cyclonic reactor 4 is collected by the gutter 7.

Alternatively, discharge may be effected by means of a pipeline 6 situated at the bottom part of the cyclonic reactor 4.

According to one preferred embodiment of the device according to the invention the static mixer 3 is fed not only by the first conduit 1 but also by at least one second feed conduit 2.

According to another preferred embodiment of the device according to the invention a portion of the liquid medium collected by the gutter 7 and/or the pipeline 6 is reinjected into one or other of the feed pipes, 1 or 2, generally by passage through a pump 8, the entirety of the device thereby forming a loop or recirculation system.

The remainder of the liquid is then removed from the loop by means of an exit pipe 9.

The determination of the amount of liquid medium to be reinjected into the feed pipe 1 or 2 can be calculated from the concentrations measured by an assay probe (not shown) and supplied by an assay pipe 13 situated preferably between the pump 8 and one of the feed pipes 1 and 2. Of course, the amount of liquid medium withdrawn by the assay pipe 13 is negligible.

The flow rates through the various pipes 1, 2, 9 and 13 are regulated by means of flow valves numbered 14, 15, 16 and 17 respectively.

The realization of a loop brings the additional advantage that the temperature of the reaction medium can be adjusted to the optimum conditions of reaction kinetics and of gas evolution. This may involve, for example, cooling in the case of exothermic reaction. This loop may also make it possible to ensure a minimal speed within the static mixer.

In order to improve further the removal of the gas or gases present in the liquid medium it is desirable to provide a gas/liquid separator 10, which can be a coalescer, and which is connected to the means for discharge 6 and/or 7 of the cyclonic reactor 4. Where a pump 8 is present in the device the outlet orifice of the separator 10 supplies the upstream side of the pump 8 via the pipe 11.

Accordingly, as can be seen in the FIGURE, the liquid medium from the gutter 7 and/or from the pipeline 6 undergoes additional separation in the coalescer 10.

The gas or gases emerging from the coalescer 10 may then, via a pipe 12, rejoin the chimney 5, and the liquid medium, freed from the gases, exits from the coalescer 10 via the conduit 11, which takes it from the upstream side of the pump 8.

According to one advantageous embodiment of the invention means (not shown) are provided for introducing air or an inert gas into the cyclonic reactor 4. This makes it possible to prevent the accumulation within the cyclonic reactor 4 of the gas or gases produced by the reaction, which in certain cases could give rise to an inflammable or explosive medium.

Means may also be provided for heating or cooling the mixer 3 and/or the cyclonic reactor 4.

The device according to the invention may be utilized for carrying out any reaction in a liquid medium in the course of which a gas is formed which is liable to give rise to the formation of foam, and particularly a reaction employing a peroxide. The operation of the device may be continuous or discontinuous.

The device according to the invention may be advantageously utilized as a dechlorination plant, especially for reducing the chlorine present in aqueous effluents.

BRIEF DESCRIPTION OF THE DRAWING

The drawing FIGURE shows a schematic of an embodiment of the invention.

PROCESS ACCORDING TO THE INVENTION

The process according to the invention may be implemented with the aid of the device according to the invention that has just been described.

Picking up the numbering of the device according to the invention as used above, the process according to the invention thus comprises the following stages:

the liquid medium is introduced into the static mixer 3 and the reaction is initiated in said static mixer 3;

the reaction medium is transferred from the static mixer 3 to a cyclonic reactor 4;

the reaction is allowed to continue in the cyclonic reactor 4; and the liquid medium exiting at the bottom from the cyclonic reactor 4 is recovered, optionally after its entry into a gas/liquid separator 10.

Generally speaking, the reaction starts in the static mixer 3 and ends in the cyclonic reactor, thereby making it possible for the gas or gases formed to be removed in a very short time.

The reaction generally continues in the cyclonic reactor on the surface to start with and then in the bottom volume, which can be adjusted by level regulation.

In the static mixer 3 a degree of progression of the reaction of from 80 to 95% is generally achieved, thereby allowing high speeds to be attained within the cyclonic reactor 4.

When the liquid medium is extracted via the pipeline 6, the bottom of the cyclonic reactor 4 acts as finisher.

According to one preferred embodiment, air or an inert gas is additionally introduced into the cyclonic reactor 4, for the reasons set out above.

It is likewise possible to heat or cool the mixer 3 and/or the cyclonic reactor 4.

The process according to the invention is applied to any reaction in liquid medium in the course of which a gas is formed which is likely to give rise to the formation of foam.

The gas may be a product of the reaction (decomposition) of the reactant present in the liquid medium.

The liquid medium may be an aqueous medium or a solvent, depending on the type of reaction envisaged. The medium is preferably aqueous.

The process according to the invention may be applied to any reaction in a liquid medium comprising at least two reactants A and B, in the course of which a gas is formed which is capable of bringing about the formation of foam. In this case it is preferred to use a device according to the invention comprising a first pipe 1 for feeding with first reactant A and a second pipe 2 for feeding with second reactant B.

The reactant A can be a reducing agent or an oxidizing agent.

If the reactant A is a reducing agent it can serve, for example, to reduce a reactant B comprising a halogen having a degree of oxidation of greater than or equal to zero.

The reactant B then may therefore comprise at least one compound chosen from the group consisting of chlorinated compounds, brominated compounds and permanganates such as sodium permanganate or potassium permanganate.

As chlorinated compounds mention may be made of chlorine, chlorine dioxide, hypochlorites such as sodium hypochlorite or calcium hypochlorite, hypochlorous acid and solid forms of chlorine.

As brominated compounds mention may be made of bromine, hypobromites, such as sodium hypobromite or calcium hypobromite, and hypobromous acid.

Where the reactant A is an oxidizing agent it may then oxidize a reactant B comprising at least one compound such as sodium chlorite, potassium chlorite, calcium chlorite, cyanide compounds, sulfur compounds and ferrous iron.

As reactant A it is possible for example to employ a reactant comprising at least one peroxide such as hydrogen peroxide and alkali metal peroxides such as sodium or potassium peroxide. Preference is given to using hydrogen peroxide.

Accordingly the process according to the invention may be advantageously employed to reduce the chlorine present in aqueous effluents.

The aqueous effluents, reactant B, generally comprise hypochlorite ions and/or chlorine and it is then preferred to select as reactant A an aqueous solution of hydrogen peroxide. The gas evolved is oxygen.

In particular the process can be used to treat an aqueous effluent comprising:

from 1 mg/l to 10 g/l and preferably from 10 mg/l to 4 g/l of $Cl_2$; and from 1 mg/l to 250 g/l and preferably from 10 mg/l to 130 g/l of NaClO.

The reactant A and/or the reactant B may further comprise a conventional antifoam.

The process according to the invention is preferably carried out at temperature and under the following conditions:

temperature: from 0 to 110° C., preferably from 20 to 80° C.;

pressure: 0.5 to 3 bar, preferably from 0.9 to 1.3 bar;

pH: from 1 to 14, preferably from 5 to 12;

residence time in the static mixer: 0.001 to 100 seconds, preferably from 0.02 to 10 seconds;

residence time in the cyclonic reactor: 10 to 400 seconds, preferably 20 to 100 seconds; and the gas/liquid separator 10 is a coalescer, the operating velocity of which is from 0.01 to 1 m/s, preferably from 0.05 to 0.8 m/s.

It may be carried out continuously or discontinuously (batchwise).

EXAMPLE

The example which follows illustrates the present invention though without limiting its scope.

An aqueous solution A of hydrogen peroxide ($H_2O_2$) is prepared with a concentration of 35% by weight.

Then an aqueous solution B is prepared which has the following composition:

| | |
|---|---|
| NaClO: | 79.07 g/l |
| NaCl: | 62.10 g/l |
| $Na_2CO_3$: | 20 g/l |
| $H_2O$: | remainder to 1 l |

An apparatus is then acquired like that shown in the attached FIGURE.

The reactor has a diameter of 0.4 m in its top part and 0.3 m in its bottom part, and a height of 0.6 m.

The coalescer has a diameter of 0.1 m over a length of 1 m.

The static mixer has a diameter of 25 mm and a length of 1 m.

The feed pipe 2 provides a feed of solution A with a regulating valve and flow meter; the feed pipe 1 provides a feed of solution B with regulating value and flow meter.

The pipe 9 provides for removal of the treated solution so as to ensure a constant level in the cyclonic reactor, with a regulating valve; the pipe 13 provides the feed of an assay probe for hydrogen peroxide in the solution treated.

The flow rate in the circuit is fixed between 1 and 5 m³/h.

The solution B is introduced at a rate of 200 l/h into the circuit, at the inlet of the static mixer 3.

The solution A is supplied at a rate of 24 l/h, which is controlled from the results provided by the $H_2O_2$ assay probe supplied via the pipe 13.

The mixing of solutions of A and B allows oxygen to be formed at the outcome of the following reaction:

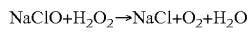

In the static mixer 3 approximately 90% of the reaction is effected, thereby allowing high rates to be achieved with a residence time of less than 1 second. The outlet of the static mixer 3 to the cyclonic reactor 4 is located tangentially in order to allow maximum removal of oxygen.

Within the cyclonic reactor 4 a level is maintained so as to allow a residence time of more than 20 seconds. This residence time allows the reaction to be completed and the removal of the oxygen to be increased. Located at the bottom of the cyclonic reactor 4 is a coalescer 10, with a transit rate of less than 1 m/s, in order to ensure the coalescence and removal of oxygen mircobubbles. The liquid outlet 11 of the coalescer 10 provides a supply to the pump 8.

Thus, with a fixed flow rate of solution B to be treated (200 l/h), the adjustment of the flow rate of solution A around 24 l/h made it possible to regulate the excess of $H_2O_2$ assayed by the probe of between 30 and 100 mg/l.

The invention claimed is:

1. A device for carrying out a reaction in a liquid medium during which evolution of gas occurs, which comprises at least:

one static mixer (3) in which emerges at least one pipe (1) for feeding with liquid medium;

one cyclonic reactor (4) connected to said static mixer (3) and equipped with a chimney (5) for the discharge of the gas or gases formed and with means for discharge (6, 7) of the liquid medium;

a pipe (18) connecting the outlet of the mixer (3) to the cyclonic reactor (4) such that the reaction medium enters the cyclonic reactor (4) tangentially; and a gas-liquid separator (10) is provided in order to receive the liquid medium originating from discharge means (6, 7).

2. The device as claimed in claim 1, wherein said means for discharge of the liquid medium comprise a gutter (7) capable of collecting the liquid medium overflowing from the top part of the cyclonic reactor (4).

3. The device as claimed in claim 1, wherein said means for discharge of the liquid medium comprise a pipeline (6) situated at the bottom part of the cyclonic reactor (4).

4. The device as claimed in claim 1, wherein said discharge means (6, 7) are connected to the feed pipe (1) and optionally to an exit pipe (9).

5. The device as claimed in claim 1, wherein an outlet (11) for the liquids from the gas-liquid separator (10) is connected to the feed pipe (1).

6. The device as claimed in claim 1, which additionally comprises means for introducing air or an inert gas into the cyclonic reactor.

7. The device as claimed in claim 1, which additionally comprises a second feed pipe (2) to the mixer (3).

8. A process in which a reaction is carried out in a liquid medium during which evolution of gas occurs, which comprises the following stages:

the liquid medium is introduced into a static mixer (3) and the reaction is allowed to begin;

the reaction medium is transferred from the static mixer (3) to a cyclonic reactor (4);

the reaction is allowed to continue in the cyclonic reactor (4); and the liquid medium exiting from the cyclonic reactor (4) is recovered, after its entry into a gas/liquid separator (10).

9. The process as claimed in claim 8, wherein the reaction medium exiting from the static mixer (3) and introduced into the cyclonic reactor (4) has a degree of reaction progression of between 80 and 95%.

10. The process as claimed in claim 8, wherein the liquid medium introduced into the static mixer (3) comprises at least two reactants A and B.

11. The process as claimed in claim 10, which is carried out in a device for carrying out a reaction in a liquid medium during which evolution of gas occurs, wherein the device comprises at least:
   one static mixer (3) in which emerges at least one pipe (1) for feeding with liquid medium;
   one cyclonic reactor (4) connected to said static mixer (3) and equipped with a chimney (5) for the discharge of the gas or gases formed and with means for discharge (6, 7) of the liquid medium.

12. The process as claimed in claim 10, wherein the reactant A is a reducing agent.

13. The process as claimed in claim 10, wherein the reactant B comprises a halogen having a degree of oxidation of greater than or equal to zero.

14. The process as claimed in claim 13, wherein the reactant B comprises at least one compound chosen from the group consisting of chlorinated compounds, brominated compounds and permanganates.

15. The process as claimed in claim 14, wherein the chlorinated compounds are chosen from the group consisting of chlorine, chlorine dioxide, sodium hypochiorite, calcium hypochlorite, hypochlorous acid and solid forms of chlorine.

16. The process as claimed in claim 14, wherein the brominated compounds are chosen from the group consisting from the group consisting of bromine, sodium hypobromite, calcium hypobromite and hypobromous acid.

17. The process as claimed in claim 10, wherein the reactant A is an oxidizing agent.

18. The process as claimed in claim 17, wherein the reactant B comprises at least one compound chosen from the group consisting of sodium chlorite, cyanide compounds, sulfur compounds and ferrous iron.

19. The process as claimed in claim 10, wherein the reactant A comprises at least one peroxide chosen from the group consisting of hydrogen peroxide and alkali metal peroxides.

20. The process as claimed in claim 19, wherein the reactant A comprises hydrogen peroxide.

21. The process as claimed in claim 10, wherein the reactant B is an aqueous effluent comprising chlorine and the reactant A comprises an aqueous hydrogen peroxide solution.

22. The process as claimed in claim 21, wherein the aqueous effluent comprises hypochlorite ions and/or chlorine.

23. The process as claimed in claim 22, wherein the aqueous effluent comprises:
   from 1 mg/l to 10 g/l of $Cl_2$; and
   from 1 mg/l to 250 g/l of NaClO.

24. The process as claimed in claim 22, wherein the aqueous effluent comprises:
   from 10 mg/l to 4 g/l of $Cl_2$ and
   from 10 mg/l to 130 g/l of NaClO.

25. The process as claimed in claim 8, which is carried out under the following conditions:
   temperature: from 0 to 110° C.;
   pressure: 0.5 to 3 bar;
   pH: from 1 to 14;
   residence time in the static mixer: 0.00 1 to 100 seconds;
   residence time in the cyclonic reactor: 10 to 400 seconds; and
   the gas/liquid separator (10) is a coalescer, the operating velocity of which is from 0.01 to 1 m/s.

26. The process as claimed in claim 8, which is carried out under the following conditions:
   temperature: from 20 to 80° C.;
   pressure: from 0.9 to 1.3 bar;
   pH: from 5 to 12;
   residence time in the static mixer: from 0.02 to 10 seconds;
   residence time in the cyclonic reactor: 20 to 100 seconds; and
   the gas/liquid separator (10) is a coalescer, the operating velocity of which is from 0.05 to 0.8 m/s.

27. The process in which a reaction is carried out in a liquid medium during which evolution of gas occurs, wherein it comprises the following stages:
   the liquid medium is introduced into a static mixer (3) and the reaction is allowed to begin;
   the reaction medium is transferred from the static mixer (3) to a cyclonic reactor (4);
   the reaction is allowed to continue in the cyclonic reactor (4); and
   the liquid medium exiting from the cyclonic reactor (4) is recovered, after its entry into a gas/liquid separator (10),
   wherein the process is carried out in a device as claimed in claim 1.

* * * * *

UNITED STATES PATENT AND TRADEMARK OFFICE
CERTIFICATE OF CORRECTION

| | |
|---|---|
| PATENT NO. | : 7,144,568 B2 |
| APPLICATION NO. | : 10/451848 |
| DATED | : December 5, 2006 |
| INVENTOR(S) | : Jean-Philippe Ricard |

Page 1 of 1

It is certified that error appears in the above-identified patent and that said Letters Patent is hereby corrected as shown below:

Column 7, line 29, reads "hypochiorite," should read -- hypochlorite, --
Column 8, line 18, reads "0.00 1" should read -- 0.001 --

Signed and Sealed this

Tenth Day of July, 2007

JON W. DUDAS
*Director of the United States Patent and Trademark Office*